July 30, 1929.　　　　E. G. WATROUS　　　　1,722,613

LAVATORY FAUCET ATTACHMENT

Filed July 26, 1926

Inventor:
Earl G. Watrous,
By Glenn S. Noble,
Atty.

Patented July 30, 1929.

1,722,613

UNITED STATES PATENT OFFICE.

EARL G. WATROUS, OF CHICAGO, ILLINOIS.

LAVATORY FAUCET ATTACHMENT.

Application filed July 26, 1926. Serial No. 124,996.

This invention relates to lavatory constructions, particularly intended for use in railway cars but which may be utilized wherever applicable.

The objects of this invention are to provide an improved lavatory and means for attaching the faucets thereto; to provide a porcelain lavatory and supply faucets with a combined faucet spout and attaching device; to provide simple and efficient fastening means for securing a faucet to a porcelain lavatory; and to provide such other advantages and improvements as will be described more fully in the following specification.

In the accompanying drawings illustrating this invention;

Figure 1:
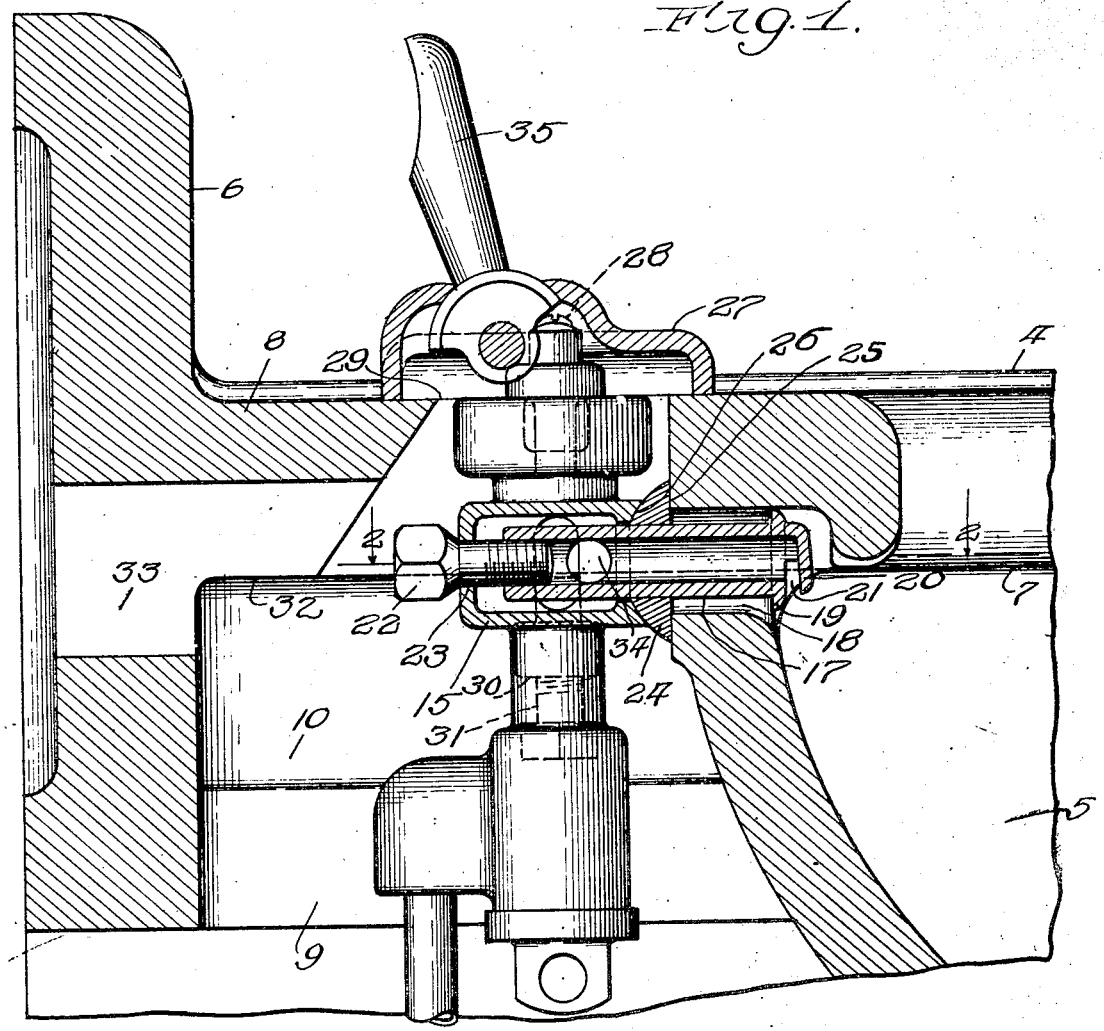
Figure 1 is a vertical sectional view of a portion of the lavatory and faucets.
Figure 2:
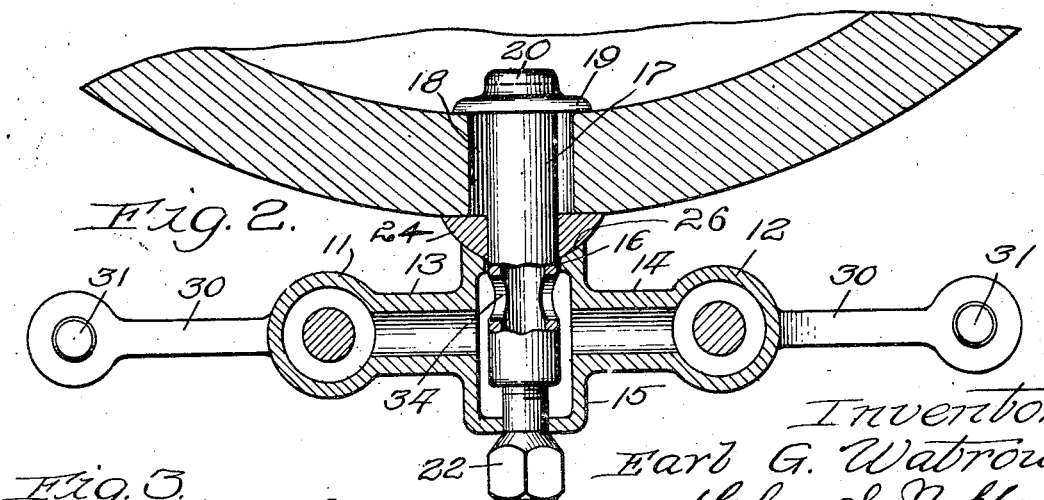
Figure 2 is a sectional view taken on the line 2—2 of Figure 1.
Figure 3:
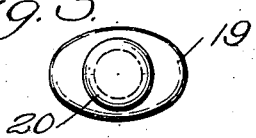
Figure 3 is a detail of the faucet spout.

In the particular form of the invention as shown in these drawings, the lavatory 4 comprises a bowl portion 5 and integrally formed back 6. The bowl has an inwardly extending flange 7 around the upper portion thereof which tends to prevent the water from being thrown or slopped out by the movement of the car. The lavatory has a top plate or slab 8 and downwardly extending side walls 9 which connect the bowl or basin 5 with the back 6 and provide a chamber 10 for the necessary valves or faucets and fittings. While one or more faucets may be used, in the arrangement shown, two faucets 11 and 12 are provided which may be used respectively for hot and cold water and are connected to the sources of supply by means of pipes or tubing in any well known manner. The faucet bodies are connected respectively by means of short passageways or connections 13 and 14 with a central chamber 15, these parts being preferably formed integrally. The central chamber 15 has a hole 16 in one side for a combined spout and fastening member 17 which is adapted to pass freely through such opening. This spout projects through a hole 18 in the side of the bowl 5, this hole being preferably arranged so that it is somewhat behind or covered by the flange or rim 7. The spout 17 is provided with a flange or projection 19 at the inner end thereof for engagement with the inner face of the bowl 5 and is also preferably provided with a deflecting lip 20 for directing the water downwardly through an opening 21 into the bowl. The spout 17 is threaded at its outer end for engagement with a fastening bolt or screw 22 which passes through a hole 23 in the adjacent side wall of the chamber. A packing washer 24 is interposed between the end of the chamber 15 and the adjacent face or side 25 of the lavatory. This washer or gasket is preferably convex on its outer surface for engagement with the concave sear 26 in the end of the chamber 15.

A cap or cover 27 is secured to the faucet and chamber structure in any desired manner, as by means of screws 28 and rests on the upper surface of the plate 8 and serves to cover the hole or opening 29 as well as to partially support the faucet structure. The faucet casing or frame work is also preferably provided with projections or arms 30 which are threaded to receive set screws 31 which extend upwardly and engage with the lower surface 32 of the plate 8 and serve to draw the valve structure downwardly so that the cap 27 will be drawn closely against the lavatory.

When the parts are to be assembled, the spout 17 is inserted through the hole 18 from the inside of the bowl and when the screw 22 is tightened, the chamber or casing 15 will be pressed against the gasket 24, and the flange 19 of the spout will be drawn against the inner face of the bowl, and when properly adjusted, the washer or gasket 24 will make a tight closure over the end of the hole 18 and will also serve to prevent leakage from the chamber 15 around the spout 17. The set screws 31 are also tightened as the screw 22 is tightened so that all of the parts are drawn closely together. The back or wall 6 may have a hole or opening 33 for convenience in inserting and tightening the screw 22. The water which comes into the chamber through the pipes or passageways 13 and 14 enters the spout 17 through one or more holes 34 in the sides of the spout. The faucets may be operated in any well known manner, as by means of levers 35, and the bowl may be provided with any ordinary or preferred drain or outlet device, the operating portions of which may for convenience be arranged in conjunction with the faucet, such arrangement being also well known.

From this description it will be seen that I provide means for readily attaching the faucets to the bowl, and the faucet spout serves the two functions of carrying the water and as a fastening means. Furthermore, the packing or gasket 24 provides a cushioning between the metallic parts and the porcelain and serves to equalize any irregularities in the surface and to insure a tight closure between the respective parts.

While I have herein shown and described a preferred form of my invention, changes may be necessary or desirable in the details of construction or arrangement of the parts in order to adapt the device to different conditions.

Therefore I do not wish to be limited to the exact construction herein shown and described, except as pointed out in the following claims, in which I claim.

1. The combination with a porcelain lavatory, of a water inlet chamber, a spout extending from said chamber into the lavatory and having an integrally formed projection engaging with the inner surface of the lavatory, means for making a tight closure between the spout, lavatory and chamber, and a screw passing through the chamber and engaging with the spout for fastening the spout to the chamber and for drawing the chamber, spout and lavatory together.

2. In a lavatory construction, the combination of a porcelain lavatory having a hole through the side thereof, a water inlet chamber, faucets connected with said chamber, a spout extending through the side of the chamber and through the hole in the lavatory and having a projection on its inner end for engagement with the inner wall of the lavatory, a screw passing through a hole in the chamber and engaging with said spout, and a gasket between the chamber and adjacent surface of the lavatory, said screw serving to draw the projection on the spout against the lavatory and to press the chamber against the gasket to make a tight closure with the lavatory.

3. The combination with a lavatory having an inwardly projecting flange around the upper portion thereof and having a hole adjacent to said flange, of a tubular spout extending outwardly through the hole and having a flange engaging with the inner surface of the lavatory and also having a deflecting lip at the inner end thereof, an inlet chamber extending over the outer end of the spout, a gasket between the chamber and the adjacent surface of the lavatory, said gasket being adapted to cover the hole through the lavatory and to make a tight connection between the spout and chamber, a screw passing through the side wall of the chamber and engaging with the threaded end of the spout and adapted to press the chamber against the gasket, and one or more faucets connected with said chamber, said spout having inlet openings for permitting the water to pass from the chamber through the spout.

4. The combination with a porcelain lavatory, comprising an integrally formed basin and slab and back with downwardly projecting side walls, of a water inlet chamber, a faucet connected with said chamber, an outlet spout passing through a hole in the side of the chamber and through a hole in the side of the basin and having a projection at the inner end thereof for engagement with the basin, said spout also having one side engaging with the basin and covering the hole therethrough and having a convex outer surface which engages with a concave recess in the side of the chamber and a screw through the side of the chamber which engages with the threaded end of the spout for drawing the parts together, substantially as described.

5. The combination with a lavatory having a hole through the top plate thereof, of a valve having a body which projects through said hole, a cap secured to the valve body and covering said hole and resting on the lavatory, and set screws carried by the valve body and adapted to engage with the lower surface of said top plate to fasten the parts together.

EARL G. WATROUS.